United States Patent [19]
Yamada

[11] Patent Number: 5,138,596
[45] Date of Patent: Aug. 11, 1992

[54] OPTICAL INFORMATION RECORDING APPARATUS INCLUDING MEANS FOR DELAYING SERVO GAIN BY A PREDETERMINED TIME

[75] Inventor: Etsuo Yamada, Sagamihara, Japan

[73] Assignee: Canon Kabushiki Kaisha, Tokyo, Japan

[21] Appl. No.: 788,365

[22] Filed: Nov. 6, 1991

Related U.S. Application Data

[63] Continuation of Ser. No. 376,048, Jul. 6, 1989.

[30] Foreign Application Priority Data

Jul. 11, 1988 [JP] Japan ............... 63-170798

[51] Int. Cl.$^5$ ............... G11B 7/00
[52] U.S. Cl. ............... 369/44.29; 369/44.35; 369/44.36
[58] Field of Search ............... 369/44.29, 44.31, 44.35, 369/44.36, 54, 116

[56] References Cited

U.S. PATENT DOCUMENTS

| | | | |
|---|---|---|---|
| 4,742,505 | 5/1988 | Takeuchi et al. | 369/45 |
| 4,817,077 | 3/1989 | Ono | 369/54 |
| 4,890,273 | 12/1989 | Takeuchi et al. | 369/45 |
| 4,912,697 | 3/1990 | Enari et al. | 369/116 |

FOREIGN PATENT DOCUMENTS

52-80802  6/1977  Japan .
52-134704 11/1977 Japan .

*Primary Examiner*—Robert L. Richardson
*Attorney, Agent, or Firm*—Fitzpatrick, Cella, Harper & Scinto

[57] ABSTRACT

An optical information recording apparatus according to the present invention prevents the saturation of an output of an amplifier, and thereby effects stable tracking and/or focusing servo. The recording apparatus includes a device for inputting an input signal modulated between at least two levels which are not zero in accordance with recording information, a device for converging a light beam intensity modulated between at least two levels which are not zero into a spot-like shape in accordance with the input signal, for scanning a recording medium, and for recording the information, a device for detecting a signal indicative of a positional error between the light beam spot and the medium in at least one of a focusing direction and a tracking direction, a servo device for correcting the positional error on the basis of the detected signal, a device for changing a gain of the servo in accordance with an intensity level of the light beam, and a device for delaying the gain by a predetermined time corresponding to a time period for a change in the level of the input signal from a higher level to a lower level.

16 Claims, 5 Drawing Sheets

FIG. 7A RECORDING INFORMATION (SIGNAL C)

FIG. 7B LIGHT OUTPUT OF LIGHT SOURCE P

FIG. 7C AMPLIFICATION DEGREE OF AMPLIFIER G (SIGNAL E)

FIG. 7D OUTPUTS OF A AND B POINTS

FIG. 7E SIGNAL D HOLD THROUGH

FIG. 7F OUTPUTS OF A' AND B' POINTS

OPTICAL INFORMATION RECORDING APPARATUS INCLUDING MEANS FOR DELAYING SERVO GAIN BY A PREDETERMINED TIME

This application is a continuation of prior application Ser. No. 07/376,048, filed Jul. 6, 1989.

BACKGROUND OF THE INVENTION

1. Field of the Invention

This invention relates to an apparatus for recording information by scanning a recording medium with light beam converged into a spot-like shape and, in particular, to an optical information recording apparatus provided with focusing and/or tracking servo means for the light beam.

2. Related Background Art

As examples of a medium using light to record information thereon and read out the recorded information, there are known various forms such as a disc-like form, a card-like form, and a tape-like form. Among them, an optical information recording medium formed into a card-like shape (hereinafter referred to as an "optical card") has a great estimated demand as a medium having a large recording capacity which is compact and light in weight and convenient to carry.

Figure 1:
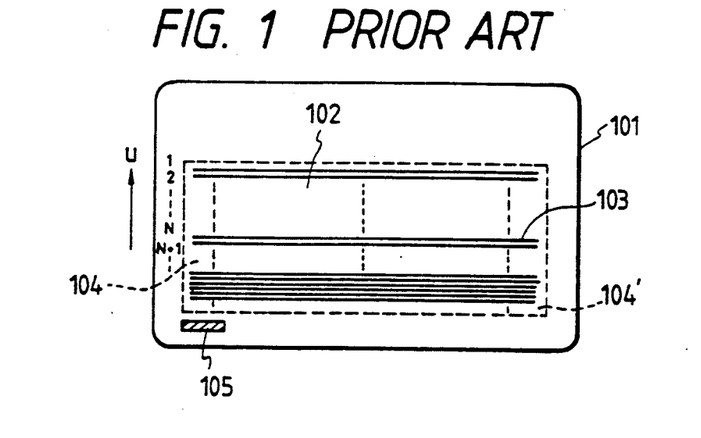
FIG. 1 is a schematic plan view showing an example of an optical card.

Referring to FIG. 1 showing a schematic plan view of such an optical card 101, reference numeral 102 denotes an information recording area; 103 indicates information tracks; 104 and 104' denote track selecting areas; and 105 denotes a home position of a light beam spot.

On the optical card 101, information is optically detectably recorded as a record bit row (information tracks) by scanning the optical card with a light beam modulated in accordance with recording information and is reduced down into a minute spot. At that time, to record the information accurately without causing any trouble such as intersection between the information tracks, it is necessary to control the irradiating position of the light beam spot on the surface of the optical card in the direction perpendicular to the scanning direction (the lengthwise direction of the tracks) (auto tracking which will hereinafter be referred to as "AT"). It is also necessary to control the light beam in the direction perpendicular to the surface of the optical card (auto focusing which will hereinafter be referred to as "AF") to irradiate the light beam as a minute spot of a predetermined size in spite of any bending or mechanical error of the optical card. Also, the above AT and AF are necessary during reproduction.

Figure 2:
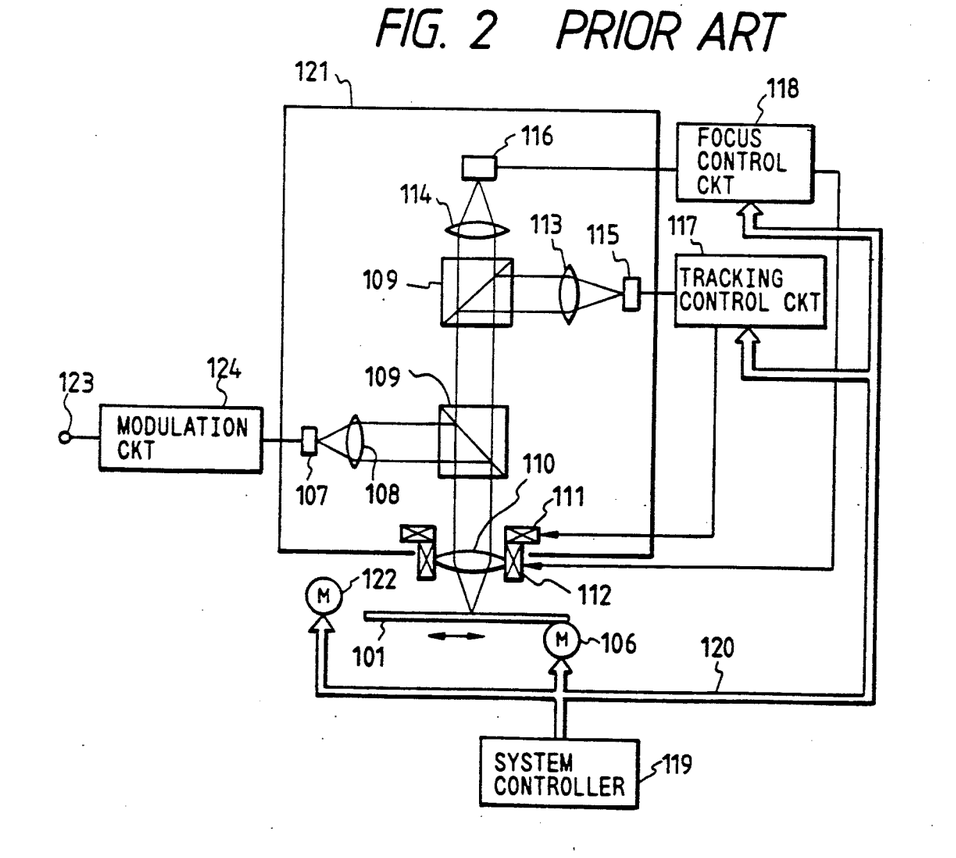
FIG. 2 is a schematic diagram showing an example of a construction of an apparatus for recording information on the optical card shown in FIG. 1.

Referring now, to FIG. 2 showing a construction of an apparatus, for recording information on and, for reproducing information from the optical card, reference numeral 106 denotes a motor for driving the optical card 101 in the direction of the double-head arrow parallel to the lengthwise direction of the tracks; 107 indicates a light source such as a semiconductor laser; 108 a collimating lens for collimating the light from the light source 107; 109 denotes a beam splitter; 110 an objective lens; 111 a coil for tracking; 112 a coil for focusing; 113 and 114 denote condenser lenses; 115 and 116 photoelectric conversion elements; 117 denotes a tracking control circuit; and 118 a focusing control circuit. Electric current is supplied to the coil 111 for tracking and the coil 112 for focusing by commands from the control circuits 117 and 118 on the basis of a tracking signal and a focusing signal detected by the photoelectric conversion elements 115 and 116 to thereby move the objective lens 110 and to accomplish the AT and AF. Reference numeral 119 designates a system controller for controlling the recording/reproducing apparatus, and reference numeral 120 denotes a group of various control signals output from the system controller. Other signals than the signals 120 are also output from the controller 119, but they are not shown. Reference numeral 121 designates an optical head, and reference numeral 122 denotes a drive motor for moving the optical head in the direction of arrow u in FIG. 1.

In accordance with an information signal which is input from a terminal 123, a modulation circuit 124 generates a signal modulated between at least two levels which are not zero and outputs the modulated signal to the light source 107. The light source 107 emits a light beam intensity modulated between two levels which are not zero in accordance with the modulated signal.

The light from the light source 107 is collimated by the collimating lens 108 and passes through the beam splitter 109 and, thereafter, is converged onto a recording track on the optical card 101 by the objective lens 110. The light reflected by the recording track is now transmitted through the beam splitter 109 and is divided into two light beams by the beam splitter 109. The divided light beams are converged onto the tracking signal detecting photoelectric conversion element 115 and the focusing signal detecting photoelectric conversion element 116 by the condenser lenses 113 and 114, respectively. Signals obtained by the photoelectric conversion elements 115 and 116 are transformed to a tracking error signal and a focusing error signal by the tracking control circuit 117 and the focusing control circuit 118, respectively. By energizing the tracking coil 111 and the focusing coil 112, the objective lens 110 is moved to thereby execute the AT and AF.

Figure 3:
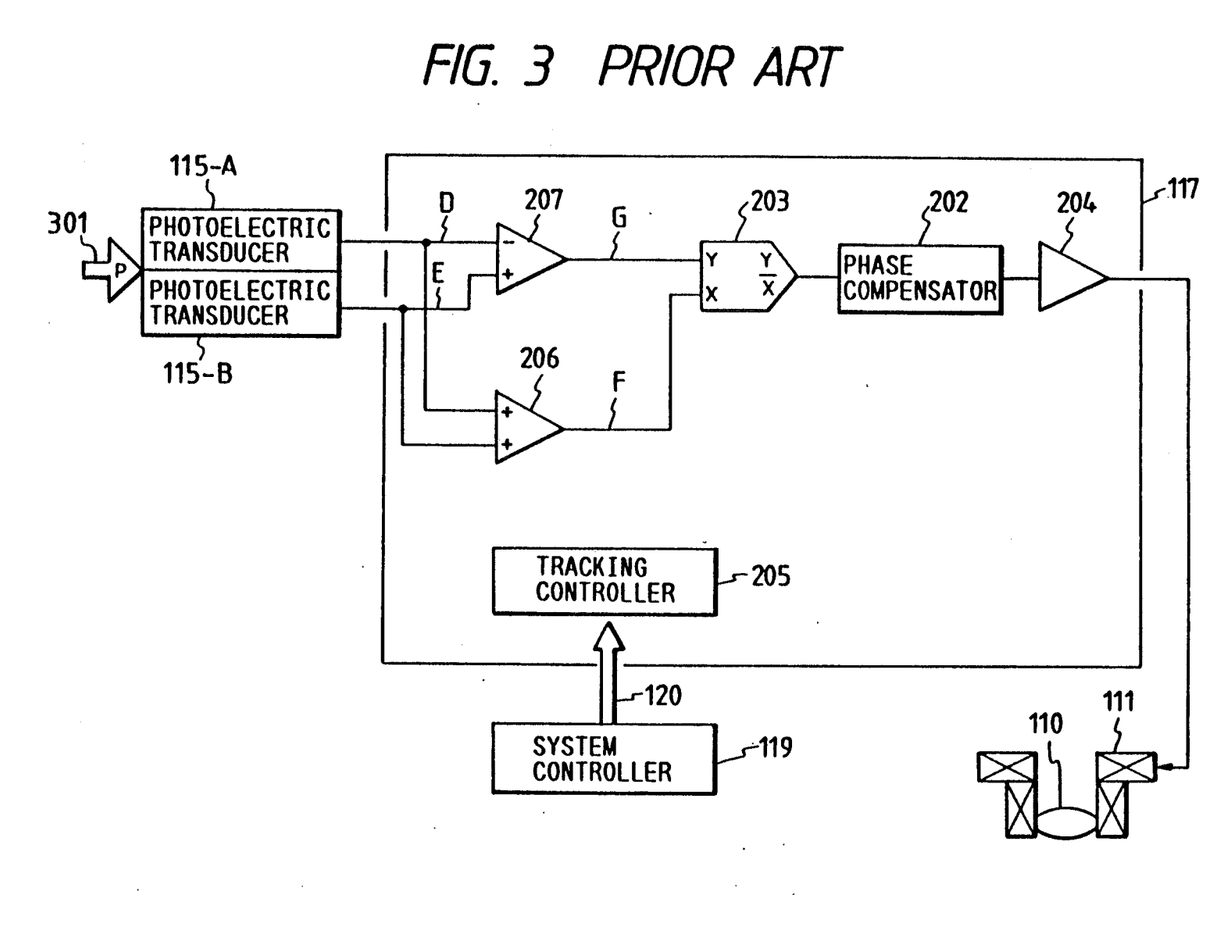
FIG. 3 is a block diagram showing an example of a conventional tracking control circuit which is used in the apparatus shown in FIG. 2.

FIG. 3 is a detailed diagram of the tracking control circuit 117.

In FIG. 3, reference numeral 301 designates reflected light resulting from the light from the light source which was reflected by the medium, reference numerals 115-A and 115-B denote photoelectric transducers divided into two by a dividing line extending in a direction corresponding to the lengthwise direction of the tracks for detecting a tracking error, and reference numeral 207 designates a subtraction circuit for subtracting signals D and E which are signals from the photoelectric transducers 115-A and 115-B and for outputting a tracking error signal. Reference numeral 206 denotes an adder circuit for adding the signals D and E; 203 designates a dividing circuit for dividing an output G of the subtraction circuit 207 and an output F of the adder circuit 206; 202 a phase compensator circuit for stabilizing the AT servo; 204 a driver for supplying a drive current to the objective lens; and 205 a tracking controller for receiving the signal 120 from the system controller 119 and controlling the entire tracking control circuit 117.

FIGS. 4A through 4D are timing charts of the signals at various positions in the circuit of FIG. 3 during recording.

Figure 4A:
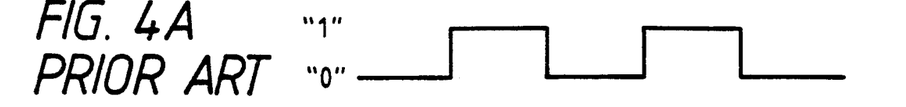
FIGS. 4A through 4D are timing charts of a signal in each section of the circuit shown in FIG. 3.
Figure 4B:
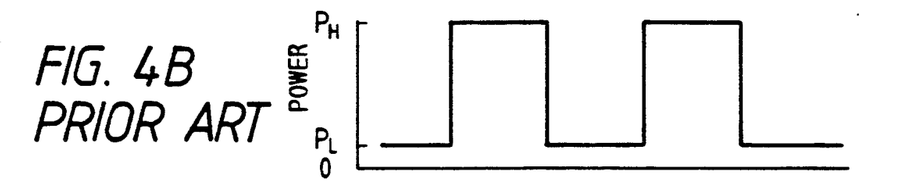
Figure 4C:
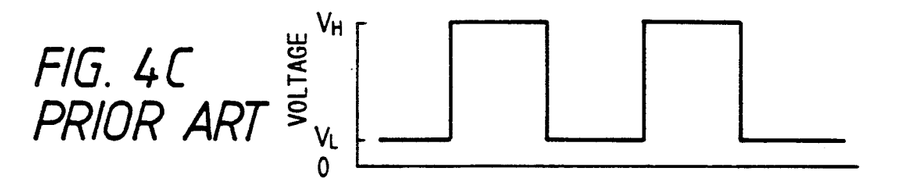
Figure 4D:
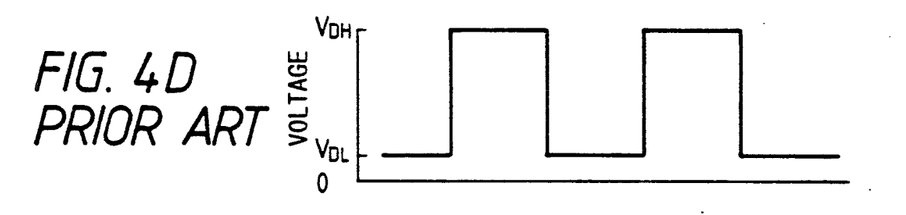

FIG. 4A shows a recording information signal, FIG. 4B shows a variation in power P of the light source modulated by the above signal, FIG. 4C shows a variation in voltages of the tracking signals D and E obtained by the power of the light source via the photoelectric transducers 115-A and 115-B, and FIG. 4D shows a variation in voltage of the addition signal F of the tracking signals D and E.

Based on signals "1" and "0" of the recording information the power P of the light source varies between into two levels $P_H$ and $P_L$. When the power is at the $P_H$ level, a pit is formed and when the power is at the $P_L$ level, no pit is formed. At this time, the signals D and E also vary between two levels. Therefore, when these signals D and E are only subtracted, the open loop gain of the AT servo when the power of the light source is set to $P_H$ is $P_H/P_L$ times as large as the open loop gain of the AT servo when the power of the light source is set to $P_L$. Thus, a problem such that oscillation easily occurs and the servo becomes unstable are caused. Particularly, in the case of an optical card in which the linear velocity is low and the zone of recording information is near the zone of the AT servo, the component of the recording information is mixed with the AT servo. As a result, the objective lens is unnecessarily moved, so that stable AT servo cannot be performed. Consequently, as an example of a method of making the open loop gain of the AT servo constant in both cases when the power of the light source is set to $P_L$ and when the power of the light source is set to $P_H$, there is a method using the dividing circuit 203 as shown in FIG. 3. That is, the output G of the subtraction circuit 207 is input to the numerator side input terminal Y of the dividing circuit 203 and the output signal F of the adder circuit 206 is input to the denominator side input terminal X of the dividing circuit 203. Thus, the variation by recording modulation is offset because even if the signals D and E vary between $V_L$ and $V_H$ as shown in FIG. 4C the signal F likewise varies between $V_{DL}$ and $V_{DH}$ as shown in FIG. 4D. Therefore, the open loop gain of the AT servo can always be made constant and stable AT servo operation can be realized.

Figure 5:
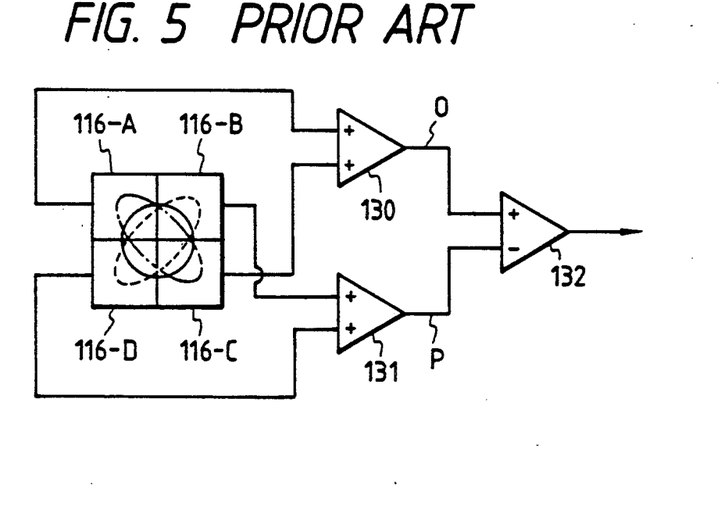
FIG. 5 is a block diagram showing an example of a circuit to obtain a focusing signal by the apparatus shown in FIG. 2.

The above method is also applicable to the AF servo. For example, a focusing signal is detected by using an anamorphic optical system like a toric lens as the lens 114 in FIG. 2 and by using as the photoelectric conversion element 116 an element whose light-receiving surface is divided into four portions 116-A through 116-D as shown in FIG. 5. A spot converged onto the light-receiving surface by the lens 114 is circular when the light beam is focused onto the medium, but when out-of-focus occurs, the spot is deformed in conformity with the direction of the out-of-focus as indicated by a broken line and an alternate long and short dash line in FIG. 5. Accordingly, a sum signal O of outputs of the two portions 116-A and 116-C which exist at the diagonal positions and a sum signal P of outputs of the two portions 116-B and 116-D are derived by adders 130 and 131, respectively. The sum signals O and P are differentiated by a differential amplifier 132 to thereby obtain a focusing signal.

The basic construction of the optical card recording-reproducing apparatus as describe above has been disclosed, for example, in U.S. Pat. No. 4,912,697. Also, the dividing, circuit of the focusing servo has been described in Japanese Laid-Open Patent Application No. 52-134704.

However, the dividing circuit 203 in the above-mentioned example of the related background art effects complicated analog processes therein and, therefore, is expensive and lacks precision. Thus, the servo circuit becomes expensive as a whole and a disadvantage arises such that the accuracy of the information recording during recording deteriorates.

On the other hand, an optical information recording-/reproducing apparatus in which the gain of the focusing servo is switched between the period of time for recording and the period of time for reproduction during which the intensity of the light beam irradiated to the medium differs has been disclosed in Japanese Laid-Open Patent Application No. 52-80802. However, such an apparatus also presents a problem such that during the recording the gain is always constant and, particularly, at a point of time when the intensity of the light beam varies, the servo becomes unstable.

To solve the problems in Japanese Laid-Open Patent Application, No. 52-80802 mentioned above, in copending U.S. patent application Ser. No. 07/794,644, further, the same applicant as the present invention has already proposed an optical information recording apparatus having means for sampling and holding a servo signal during the period of time when the intensity of the light beam is being shifted between different levels. However, in such an apparatus, when a signal to drive a light source changes from a higher level to a lower level, although the gain of an amplifier is instantaneously switched from the low level to the high level, a slight delay time exists until the intensity of the light beam is changed to the low level. Therefore, a signal corresponding to the light beam of the high intensity is input to the high gain amplifier and an output of the amplifier is saturated, so that ringing occurs in the output waveform of the amplifier for the period of time until the output is returned to the normal state. It is considered that the ringing makes the tracking/focusing servo unstable.

SUMMARY OF THE INVENTION

It is an object of the present invention to improve the apparatuses of the related background mentioned above and to provide an optical information recording apparatus in which the saturation of an output of an amplifier is prevented and, further, in which stable tracking and-/or focusing servo can be executed.

According to the invention, the above object is accomplished by an optical information recording apparatus comprising: means for inputting a signal modulated between at least two levels which are not zero in accordance with information; means for converging a light beam which has been intensity modulated between at least two levels which are not zero into a spot shape in accordance with the input signal, for scanning a recording medium, and for recording the information; means for detecting a signal indicative of a positional error between the light beam spot and the medium in a focusing direction which is perpendicular to the medium surface and/or a tracking direction which is perpendicular to tracks formed on the medium in a plane which is parallel to the medium surface; servo means for correcting the positional error on the basis of the detected signal; means for changing a gain of the servo means in accordance with an intensity level of the light beam; and means for delaying the gain by a predetermined time corresponding to a time period for the level of the input signal in from a higher level to a lower level.

DETAILED DESCRIPTION OF THE PREFERRED EMBODIMENT

The present invention will be described in detail hereinbelow with respect to an optical card recording apparatus as an example.

Figure 6:
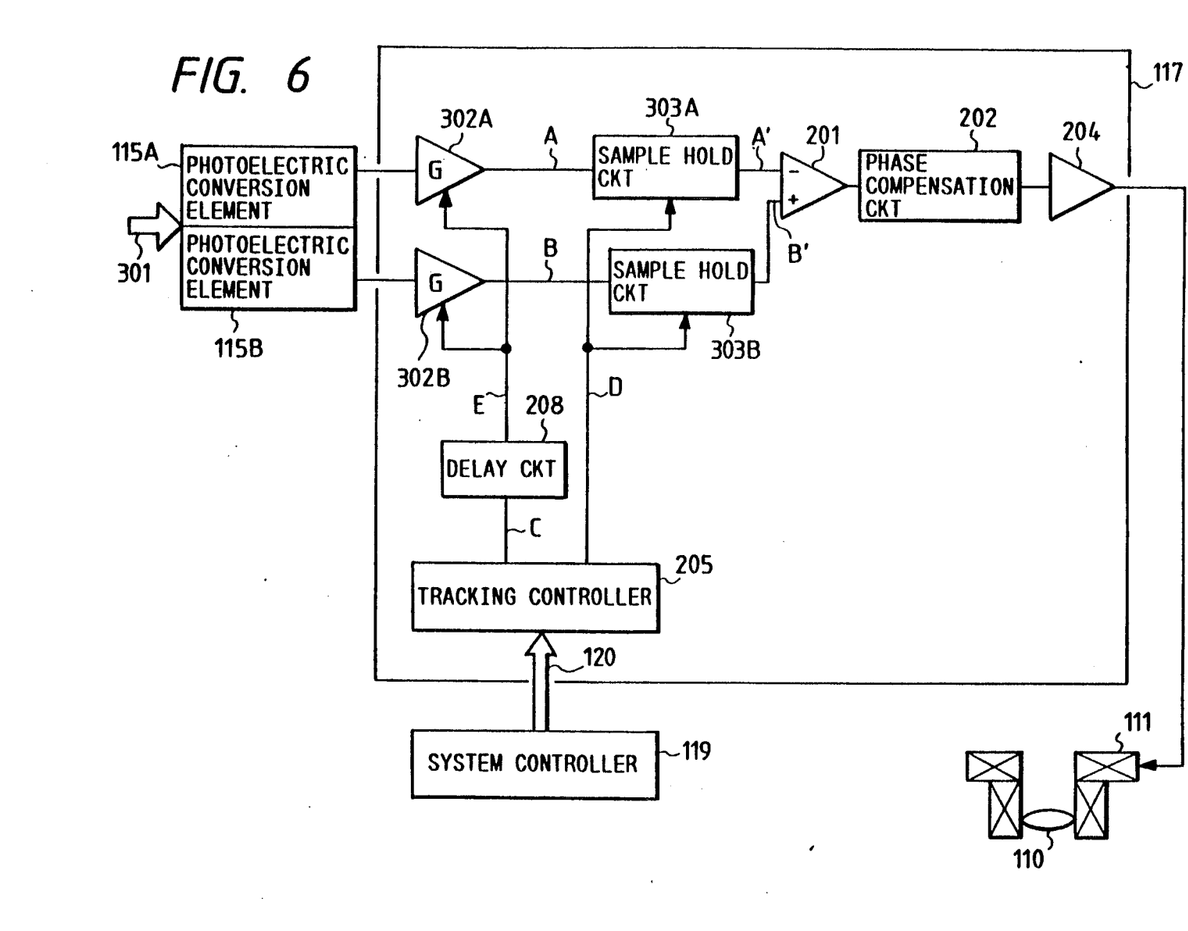
FIG. 6 is a block diagram showing an embodiment of a tracking control circuit which is used in an optical information recording apparatus according to the present invention.

FIG. 6 is a block diagram showing an embodiment of a tracking control circuit of an optical information recording apparatus according to the invention. The circuit is directly assembled to the construction shown in FIG. 2. In FIG. 6, the same parts and components as those shown in FIGS. 2 and 3 are designated by the same reference numerals and their detailed descriptions are omitted. In FIG. 6, reference numeral 301 denotes the reflected light from the surface of an optical card medium; reference numerals 115A and 115B indicate two divided photoelectric conversion elements to detect a tracking error; 302A and 302B amplifiers to switch an amplification degree into two levels ($G_H/G_L$) by a signal C to thereby keep the servo gain constant; 303A and 303B sample and hold circuits to sample and hold signals A and B by a signal D; reference numeral 201 indicates a subtraction circuit for performing the subtraction between output signals from the sample and hold circuits 303A and 303B and for outputting a tracking error signal; 202 the phase compensation circuit to stabilize the AT servo; 204 the driver for receiving a signal from the phase compensation circuit 202 and for supplying an objective lens driving signal to the tracking coil 111; and 208 a delay circuit for delaying the signal C, which is supplied from the tracking controller 205 to the amplifiers 302A and 302B, by a predetermined time.

Figure 7A:
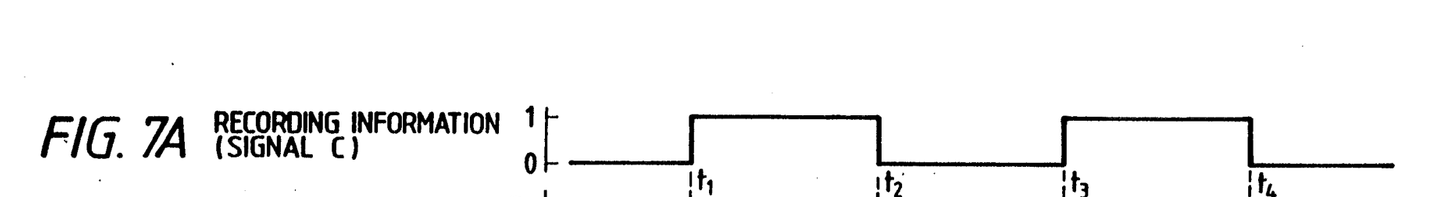
FIGS. 7A through 7F are timing charts of a signal in each section of the circuit shown in FIG. 6.
Figure 7B:
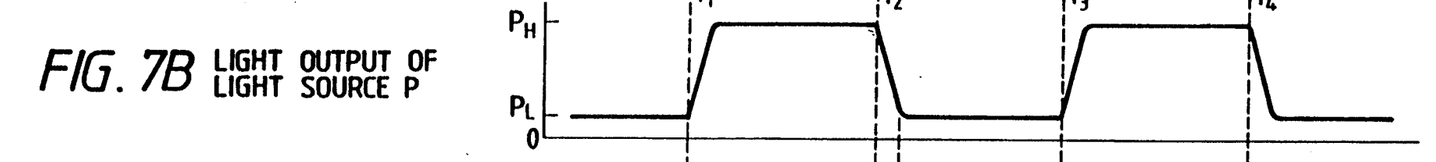
Figure 7C:
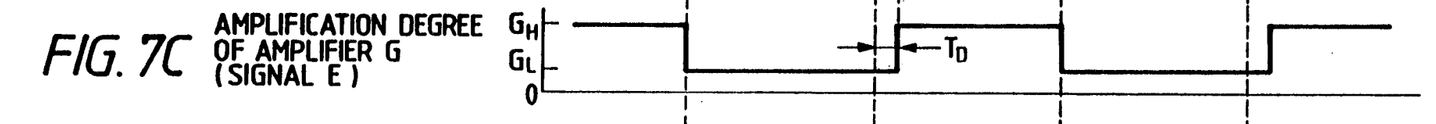
Figure 7D:
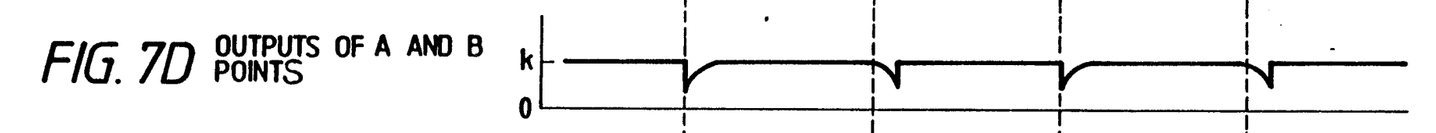
Figure 7E:
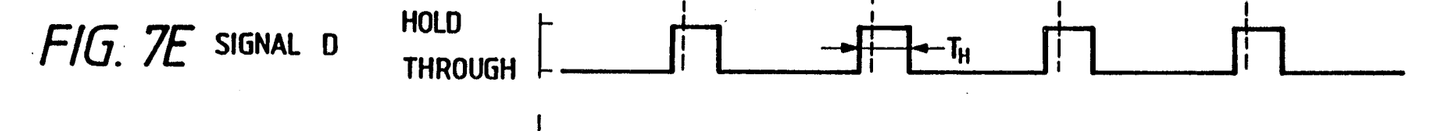
Figure 7F:
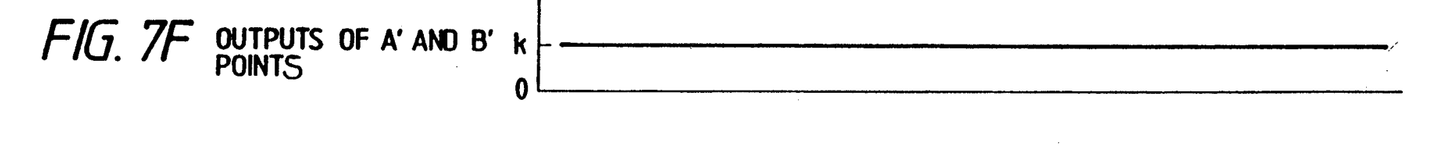

FIGS. 7A through 7F are timing charts of the signals shown in FIG. 6. The reflected light from the optical card medium surface is received by the photoelectric conversion elements 115A and 115B to detect a tracking error. The output signals from the elements 115A and 115B are input to the amplifiers 302A and 302B. As shown in FIG. 7C, the signals are amplified at a low gain $G_L$ when the recording information is set to "1" and the signals are amplified at a high gain $G_H$ when the recording information is set to "0", thereby keeping the servo gain constant. This allows the tracking error signal to be output as an accurate value in the subtraction circuit 201, which will be explained hereinafter. The signals A and B output from the amplifiers 302A and 302B are input to the sample and hold circuits 303A and 303B and are sampled and held by the signal D shown in FIG. 7E from the tracking controller 205. That is, the signals A and B are sampled by the signal D prior to change time points $t_1, t_2, t_3, t_4, \ldots$ of the recording information and, thereafter, the sampled signals are held for only a period of time $T_H$ and signals A' and B' shown in FIG. 7F are output. The signals A' and B' are input to the subtraction circuit 201 and the subtraction is executed between the signals A' and B' and a tracking error signal is output. The objective lens driving signal is supplied to the tracking coil 111 through the phase compensation circuit 202 and driver 204.

In the embodiment, the delay circuit 208 is provided for the signal C which is transmitted from the tracking controller 205 to the amplifiers 302A and 302B. That is, the signal C is transferred through the delay circuit 208 and causes the signal E to switch the amplification degree ($G_H/G_L$) of the amplifiers 302A and 302B.

As shown in FIG. 7C, the light output of the light source modulated by the recording information (FIG. 7A) causes a delay time of $T_D$. The amplification degree of the amplifiers 302A and 302B is changed to the high gain $G_H$ for the recording information (signal C) of "0" and to the low gain $G_L$ for "1". However, the same signal as the signal in the case of "1" is output (signal E) for only the time $T_D$ from the switching time point from "1" to "0" by the delay circuit 208. Thus, the low gain $G_L$ state of the amplification degree of the amplifiers 302A and 302B is held longer only for the time $T_D$ and, thereafter, the gain is shifted to the high gain $G_H$ state (FIG. 7E). Thus, for the time interval until the light output P of the light source reaches a stationary value of a reproduction output $P_L$ from a recording output $P_H$, the amplification degree of the amplifiers 302A and 302B is held to the low gain $G_L$ It is possible to prevent the outputs A and B from being saturated by the recording output $P_H$.

Although the embodiment has been described with respect to the AT servo, the invention can be likewise applied to the AF servo. For instance, in the circuit shown in FIG. 6, if the signals O and P shown in FIG. 5 are input in place of the signals D and E and the output signal of the driver 204 is input to the focusing coil 112 shown in FIG. 2, stable AF servo can be executed.

The invention is not limited to the above embodiment, but many various modifications and applications are possible.

For instance, although the embodiment has been described with respect to an apparatus for switching the amplification degree of the amplifiers to a predetermined value, the invention also can be applied to an apparatus in, which the gain changes in an analog-wise manner in accordance with the intensity of the light beam.

On the other hand, the invention not only can be applied to an apparatus using a WORM type recording medium, but also to an apparatus using a writable type recording medium such as a magneto-optical disk or the like. Further, the shape of the medium is not limited to the card shape, but may be any of the disk shape, tape shape, and the like.

The invention incorporates all of the above applications without departing from the spirit and scope of the following claims of the invention.

What is claimed is:

1. An optical information recording apparatus comprising:
    input means for inputting a modulated input signal modulated between at least two non-zero levels in accordance with recording information;
    recording means for converging a light beam intensity modulated between at least two non-zero levels into a spot-like shape in accordance with the modulated input signal input to said recording means by said input means, for scanning a recording medium to record the information on the recording medium, the intensity level of the light beam changing in accordance with a delay in timing during a change of the modulated input signal between levels;

detecting means for detecting a positional error signal indicative of a positional error between the converged light beam and the medium in at least one of a focusing direction perpendicular to a surface of the medium and a tracking direction perpendicular to tracks which are formed on the medium in a plane parallel to the medium surface;

servo means for correcting the positional error on the basis of the positional error signal detected by said detecting means;

delaying means for delaying a trailing timing of the modulated signal by a predetermined time corresponding to a time period for a change in the level of the modulated light beam intensity from a higher level to a lower level and for producing a switching signal; and gain changing means for changing the gain of said servo means in accordance with the switching signal produced by said delaying means.

2. An apparatus according to claim 1, further comprising means for sampling and holding the positional error signal at least for a time interval when the intensity of the light beam shifts between levels.

3. An apparatus according to claim 1, wherein said detecting means comprises photoelectric conversion elements for receiving light of the light beam reflected from the recording medium.

4. An apparatus according to claim 1, wherein said recording means comprises:

an optical head comprising a light source for emitting a light beam and an objective lens for converging the light beam emitted from said light source; and a motor for relatively moving said optical head and the recording medium, in a longitudinal direction with respect to the tracks formed on the recording medium.

5. An apparatus according to claim 4, wherein said servo means comprises:

driving means for driving said objective lens in at least one of the focusing direction and the tracking direction; and a feedback circuit for feeding the positional error signal back to said driving means.

6. An optical information recording apparatus comprising:

a modulation circuit for outputting a modulated signal modulated between at least two non-zero levels in accordance with recording information;

a light source for emitting a light beam intensity modulated between at least two non-zero levels in accordance with the modulated signal output by said modulation circuit, the intensity level of the light beam changing in accordance with a delay in timing during a change of the modulated signal between levels;

an object lens for converging the light beam emitted from said light source onto a recording medium;

a motor for moving the recording medium relative to the light beam;

photoelectric conversion elements for receiving light of the light beam reflected by the recording medium and for outputting signals corresponding to the received light beam;

a detecting circuit for detecting at least one of a focusing error signal and a tracking error signal based on the signals output by said photoelectric conversion elements;

an actuator for moving the objective lens in at least one of a direction of an optical axis of said objective lens and a direction perpendicular to the optical axis in accordance with at least one of the focusing error signal and the tracking error signal detected by said detecting circuit;

a delay circuit for outputting a switching signal in which a trailing timing of the modulated signal output from said modulation circuit is delayed by a predetermined time on the basis of the modulated signal output from the modulation circuit; and amplifiers arranged in a servo loop connecting said photoelectric conversion elements and said actuator, gains of said amplifiers being changed in accordance with the switching signal output by said delay circuit.

7. An apparatus according to claim 6, further comprising sample and hold circuits for sampling and holding at least one of the focusing error signal and the tracking error signal detected by said detecting circuit at least for a time internal when the intensity of the light beam shifts between levels.

8. A method of recording a signal modulated between at least two non-zero levels on an optical recording medium, said method comprising the steps of:

irradiating the recording medium with a light beam intensity modulated between at least two non-zero levels according to a modulation signal, the intensity level of the light beam changing in accordance with a delay in timing during a change of the modulation signal between levels;

effecting at least one of focusing servo and tracking servo of the light beam;

delaying a trailing timing of the modulation signal for a time corresponding to the delay caused by a change in the intensity level of the light beam, and producing a switching signal; and changing a gain of at least one of the focusing servo and the tracking servo in accordance with the switching signal.

9. A method according to claim 8, further comprising a step of sampling and holding at least one of the focusing servo and the tracking servo during a change in the intensity of the light beam between different levels.

10. An apparatus for recording a recording signal on an optical recording medium, said apparatus comprising:

scanning means for scanning the recording medium with an irradiating light beam intensity-modulated between at least two non-zero levels in accordance with the recording signal;

detecting mens for detecting a positional error signal indicative of a positional error between the irradiating light beam and the recording medium in at least one of a focusing direction perpendicular to a surface of the recording medium and a tracking direction perpendicular to tracks which are formed on the recording medium in a plane parallel to the medium surface;

servo means for correcting the positional error on the basis of the positional error signal detected by said detecting means;

delaying means for delaying a trailing timing of the recording signal by a predetermined time period, and for producing a switching signal; and gain changing means for changing the gain of said servo means in accordance with the switching signal produced by said delaying means.

11. An apparatus according to claim 10, further comprising means for sampling and holding the positional error signal at least for a time interval during which the intensity of the light beam shifts between levels.

12. An apparatus according to claim 10, wherein said detecting means comprises photoelectric conversion elements for receiving light of the light beam reflected from the recording medium.

13. An apparatus according to claim 10, wherein said scanning means comprises:

an optical head comprising a light source for emitting a light beam and an objective lens for converging the light beam emitted from said light source; and a motor for relatively moving said optical head and the recording medium in a longitudinal direction with respect to the tracks formed on the recording medium.

14. An apparatus according to claim 13, wherein said servo means comprises:

an actuator for driving said objective lens in at least one of the focusing direction and the tracking direction; and a feedback circuit for feeding the positional error signal back to said actuator.

15. A method of recording a recording signal on an optical recording medium, said method comprising the steps of:

scanning the recording medium with a light beam intensity-modulated between at least two non-zero levels in accordance with the recording signal;

effecting at least one of a focusing servo and a tracking servo of the light beam;

delaying a trailing timing of the recording signal by a predetermined time period and producing a switching signal; and changing the servo gain of at least one of the focusing servo and the tracking servo in accordance with the switching signal produced.

16. A method according to claim 15, further comprising a step of sampling and holding at least one of the focusing servo and the tracking servo during a time period in which the intensity of the light beam shifts between different levels.

* * * * *

UNITED STATES PATENT AND TRADEMARK OFFICE
CERTIFICATE OF CORRECTION

PATENT NO. : 5,138,596

DATED : August 11, 1992

INVENTOR(S) : Etsuo Yamada

It is certified that error appears in the above-identified patent and that said Letters Patent is hereby corrected as shown below:

COLUMN 1

Line 13, "with" should read --with a--;
    Line 52, "now," should read --now--; and
    Line 53, "apparatus," should read --apparatus-- and "and," should read --and--.

COLUMN 2

Line 57, "signal 120" should read --signals 120--.

COLUMN 3

Line 13, "a problem" should read --problems--; and
    Line 59, "dividing," should read --dividing--.

COLUMN 4

Line 13, "Application," should read --Application--;
    Line 60, "the level" should read --a change in the level--; and
    Line 61, "in" should be deleted.

COLUMN 5

Line 42, "signal," should read --signal--.

UNITED STATES PATENT AND TRADEMARK OFFICE
CERTIFICATE OF CORRECTION

PATENT NO. : 5,138,596
DATED : August 11, 1992
INVENTOR(S) : Etsuo Yamada

It is certified that error appears in the above-identified patent and that said Letters Patent is hereby corrected as shown below:

COLUMN 6

Line 12, "$(G_H/G_L))$" should read --$(G_H/G_L)$--;
Line 29, "$G_L$" should read --$G_L.$--; and
Line 46, "in," should read --in--.

COLUMN 7

Line 63, "object" should read --objective--.

COLUMN 8

Line 58, "mens" should read --means--.

Signed and Sealed this

Twelfth Day of October, 1993

Attest:

BRUCE LEHMAN

*Attesting Officer*     *Commissioner of Patents and Trademarks*